United States Patent
Fisk et al.

(10) Patent No.: US 6,710,861 B2
(45) Date of Patent: Mar. 23, 2004

(54) METHOD AND APPARATUS FOR MEASURING WEB STRAIN IN A CONFINED AREA

(75) Inventors: Jeffery Alan Fisk, Olney, MD (US); Richard Eric Nordgren, Daleville, VA (US)

(73) Assignee: MeadWestvaco Corporation, Stamford, CT (US)

(*) Notice: Subject to any disclaimer, the term of this patent is extended or adjusted under 35 U.S.C. 154(b) by 0 days.

(21) Appl. No.: 10/245,438

(22) Filed: Sep. 17, 2002

(65) Prior Publication Data

US 2003/0020896 A1 Jan. 30, 2003

Related U.S. Application Data

(63) Continuation-in-part of application No. 09/542,015, filed on Apr. 3, 2000, now Pat. No. 6,480,655.

(51) Int. Cl.[7] .............................................. G01B 11/16
(52) U.S. Cl. ........................... 356/32; 356/429; 385/12
(58) Field of Search ........................ 356/32, 429, 430; 385/12, 13; 73/800; 250/227.14

(56) References Cited

U.S. PATENT DOCUMENTS

| | | | |
|---|---|---|---|
| 4,664,486 A | * | 5/1987 | Landre et al. |
| 4,762,120 A | * | 8/1988 | Hussein |
| 4,800,890 A | * | 1/1989 | Cramer |
| 5,726,907 A | | 3/1998 | Davidson et al. |
| 5,757,473 A | | 5/1998 | Kanduth et al. |
| 5,798,521 A | | 8/1998 | Froggatt |
| 5,811,796 A | * | 9/1998 | Marchman et al. |
| 5,812,251 A | | 9/1998 | Manesh |
| 5,821,426 A | | 10/1998 | Uchiyama |
| 5,828,059 A | | 10/1998 | Udd |
| 5,880,463 A | | 3/1999 | Uchiyama |
| 5,920,383 A | * | 7/1999 | Chen et al. |

* cited by examiner

*Primary Examiner*—Frank G. Font
*Assistant Examiner*—Michael P. Mooney
(74) *Attorney, Agent, or Firm*—D. L. Bowman

(57) ABSTRACT

This invention is directed to a method and apparatus for the measurement of web strain in a confined area. The apparatus comprises a fiber optic scope means and a fiber optic tube means operatively connected to the fiber optic scope means. The fiber optic scope means is secured inside the fiber optic tube means. An adjustable stand-off means is placed on the web. In an exemplary embodiment the stand-off means is operatively connected to the fiber optic tube means to provide a fixed but adjustable focal length between an end of the fiber optic scope means and the surface of the web. In an exemplary method, the web surface is marked with a series of reference points. The reference points are visually measured using the fiber optic scope means. After the web undergoes a movement, such as a converting step or fold, the web is again visually examined using the fiber optic scope means. The relative movement of the reference points is visually determined.

12 Claims, 4 Drawing Sheets

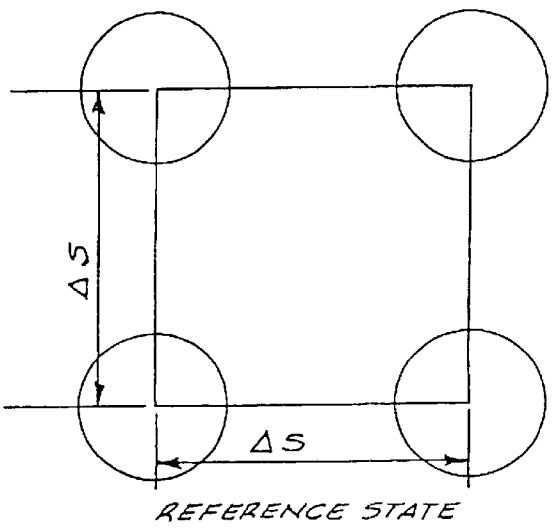
Figure 4a — REFERENCE STATE
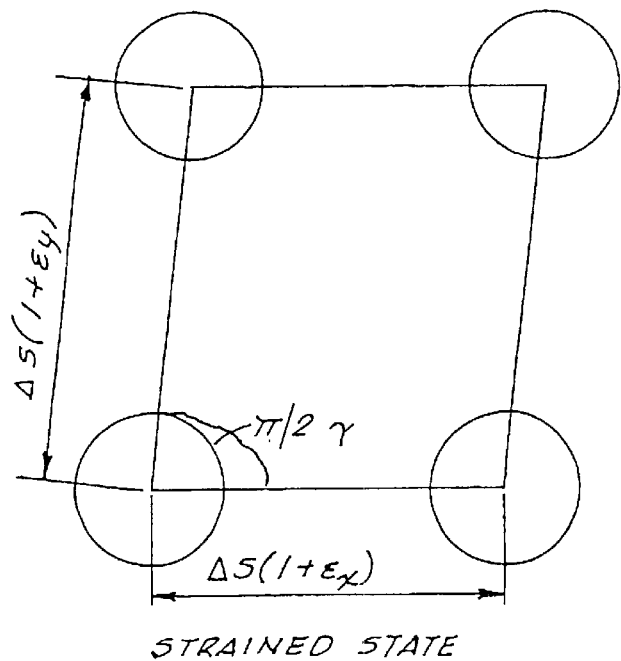
Figure 4b — STRAINED STATE

METHOD AND APPARATUS FOR MEASURING WEB STRAIN IN A CONFINED AREA

RELATIONSHIP TO OTHER APPLICATIONS

This application is a continuation-in-part of U.S. Ser. No. 09/542,015 filed on Apr. 3, 2000 now U.S. Pat. No. 6,480,655.

BACKGROUND OF THE INVENTION

1. Field of the Invention

The invention is directed to a method and apparatus for measuring web strain in a confined area.

2. Description of the Related Art

It is known that visual access to the web and carton forming area is hindered by packaging machinery, making web strain measurement very difficult. Furthermore, the geometry of a web changes considerably during converting operations, thereby making traditional optical strain measurement techniques unworkable.

It is known to use photographs to measure web strain. Exemplary of such prior art are U.S. Pat. No. 5,757,473 ('473) to H. Kanduth et al., entitled "Optical Strain Sensor for the Measurement of Microdeformations of Surfaces," U.S. Pat. No. 5,812,251 ('251) to A. Manesh, entitled "Electro-Optic Strain Gages and Transducer," and U.S. Pat. No. 5,920,383 ('383) to F. Chen et al., entitled "Microscopic Digital Imagining Strain Gauge."The '473, '251, and '383 references teach photographing the web in strained and unstrained conditions; however, they are not readily adaptable to confined areas. Access to the web must be unhindered for the microscope lenses, prisms, surface attachments, etc. Thus making the conventional techniques unacceptable in confined areas.

Web strain measurements in more confined areas can be conventionally made using digital cameras and conventional fiber optic scopes to photograph a web area with marked reference points. FIG. 1 illustrates a conventional narrow fiber optical scope 2 that can be fitted with a camera (not shown). Scope 2 includes a conventional fiber optic 4. The end of the fiber optic 7 is placed at a known focal length from an object 50. Exemplary of such prior art is U.S. Pat. No. 5,726,907 ('907) to D. L. Davidson et al., entitled "Bi-Axial Non-Contacting Strain Measurement Using Machine Vision." The '907 reference teaches a method whereby a digital camera photographs a sample area having marked reference points marked. Any subsequent sample strain is determined by comparing the relative movement of the reference points from one another. Using a digital computer, strain measurement may be automated. The above method works well for one-directional strain. However, for bi-axial strains the geometry, e.g. focal length, between the camera and web must be maintained throughout the measurement process. If the focal length and/or incident angle of the focal axis changes in an uncertain manner, the web strain cannot accurately be measured.

It is apparent from the above that there exists a need in the art for a method and apparatus for measuring web strain in a confined area.

SUMMARY OF THE INVENTION

The invention fulfills these needs by providing a method and apparatus for measuring web strain in a confined area. The apparatus comprises a fiber optic scope means and a fiber optic tube means operatively connected to the fiber optic scope means. The fiber optic scope means is secured inside the fiber optic tube means. An adjustable stand-off means is placed on the web. In an exemplary embodiment the stand-off means is operatively connected to the fiber optic tube means to provide a fixed but adjustable focal length between an end of the fiber optic scope means and the surface of the web.

In an exemplary method, the web surface is marked with a series of reference points. The reference points are visually located using the fiber optic scope means. After the web undergoes a movement, such as a converting step or fold, the web is again visually examined using the fiber optic scope means. The relative displacement of the reference points from the web movement is visually determined.

BRIEF DESCRIPTION OF THE DRAWINGS

FIGS. 4 and 4a illustrate an exemplary reference state (FIG. 4a) and strained state (FIG. 4b) for reference points according to the invention.

DETAILED DESCRIPTION OF THE INVENTION

Figure 1:
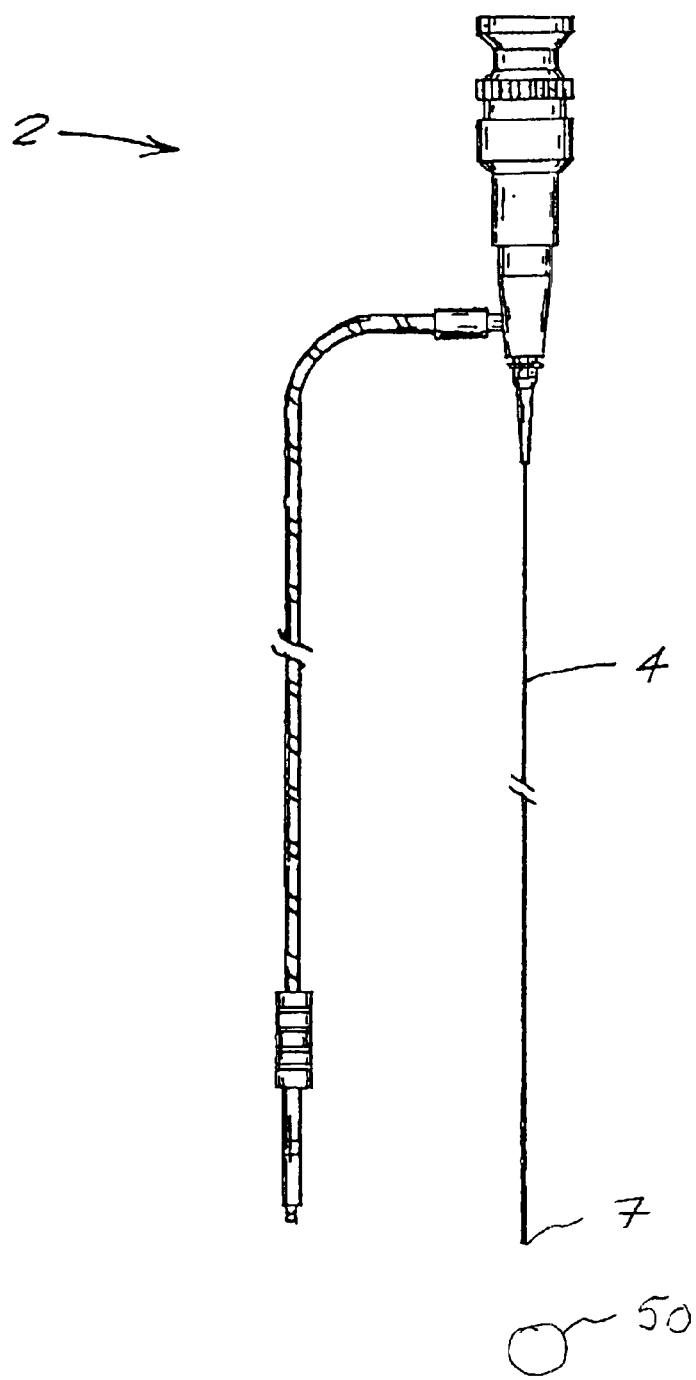
FIG. 1 is an illustration of a conventional fiber optic scope.
Figure 2:
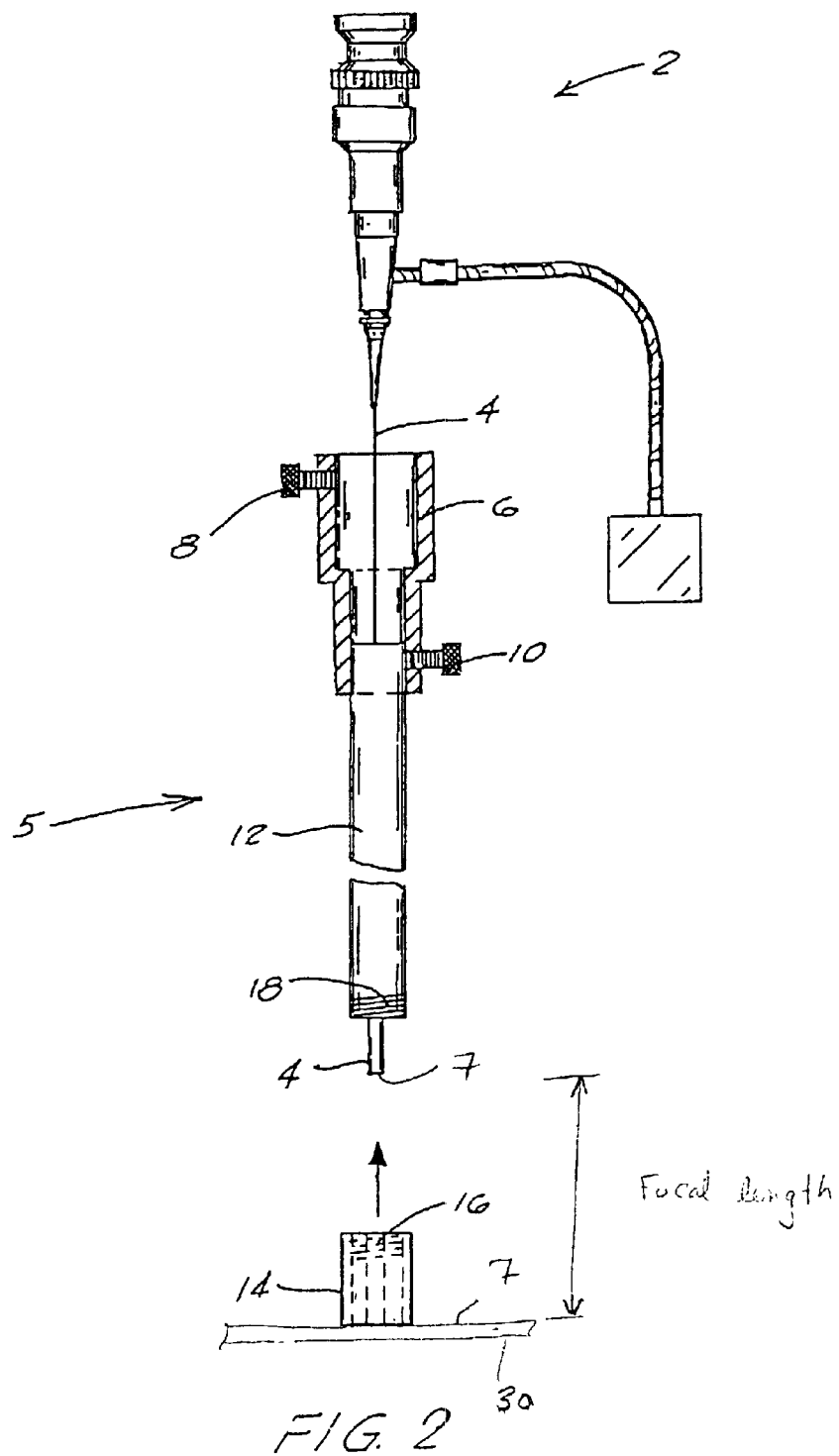
FIG. 2 is an illustration of an apparatus for measuring web strain in a confined area, according to the invention.

FIG. 2 illustrates an exemplary apparatus 5 according to the invention. The apparatus 5 is designed so that the fiber optic means 4 of a fiber optic scope 2 is at least partially secured within the apparatus 5. The end 7 of the fiber optic means 4 is exemplary illustrated extending from apparatus 5 at some focal length from the surface 31 of the web 30. Apparatus 5 includes bracket 6, fastener 8, fastener 10, fiber optic tube means 12, and optional thread end 18. Preferably, bracket 6 is constructed of any suitable material, such as metal. Preferably, fasteners 8 and 10 are conventional set screws. Finally, threads 18 and fiber optic tube means 12 are formed by conventional techniques. It is to be understood that a camera (not shown) can be operatively connected to fiber optic scope 2 to collect optical data of a web area, such as a picture.

Figure 3:
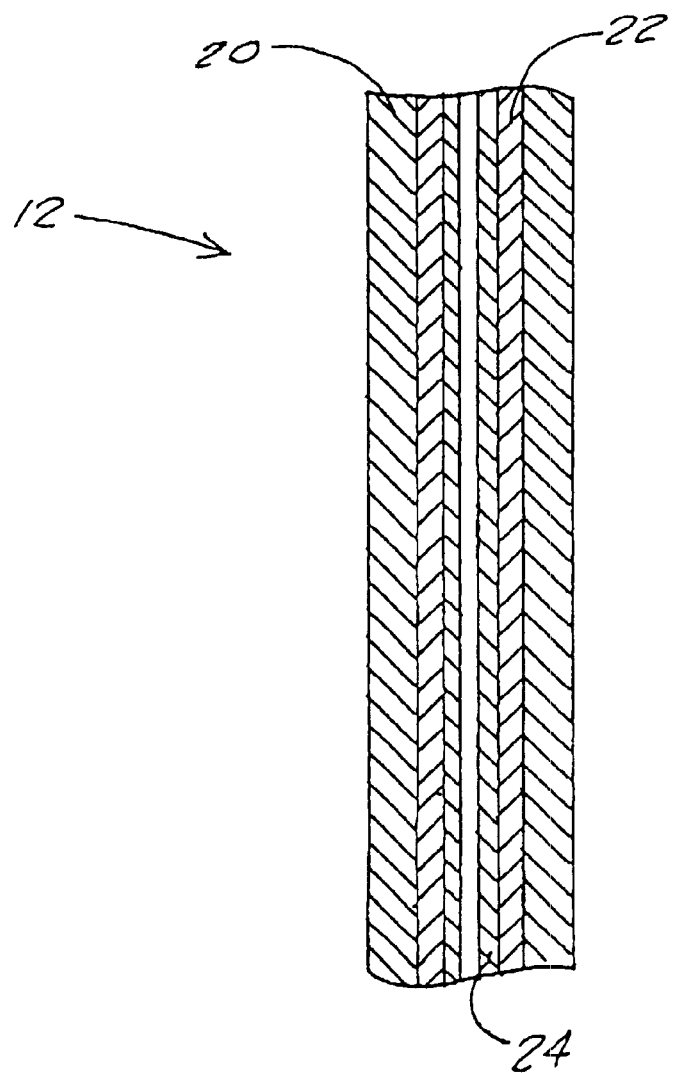
FIG. 3 is a cross-sectional view of FIG. 2.

FIG. 3 illustrates fiber optic tube means 12 in greater detail. Tube means 12 exemplary includes three concentric tubes 20, 22, 24. The tube means 12 are exemplary constructed of stainless steel or other suitable metals. The three tubes 20, 22, and 24 have exemplary dimensions of one-quarter inch outside diameter (O.D.) tube 20, a one-eighth inch O.D. tube 22, and a one-sixteenth O.D. tube 24. Tube 24 also has an inside diameter (I.D.) of 0.022 inches. The inner tube 24 is used to guide fiber optic 4 through tube means 12. Preferably, tubes 20, 22, and 24 are secured together by conventional techniques. Alternatively, a flexible tube assembly or a two tube and assembly may be used. Finally, apparatus 5 may also have a beveled end of a known angle to accommodate confined spaces while maintaining a fixed geometry.

FIG. 2 also illustrates an adjustable stand-off 14. The stand-off 14 is shown supported by the web 30. It is to be understood that the end 7 of the fiber optic means may optionally be operatively connected to stand-off 14. The stand-off 14 is exemplary illustrated with threaded end 16 which can be secured to apparatus 5 via thread 18. Preferably, adjustable stand-off 14 is constructed of any suitable material, such as metal. Adjustable stand-off 14 and thread 16 are formed by conventional techniques. Apparatus 5 and stand-off 14 when secured to each other provide a fixed focal length between the end 7 of fiber optic mean 4 and the surface 31 of the web 30.

In an exemplary method, web strain can be measured in a confined area by using an optical scope means 2, apparatus 5, stand-off 14, and optical equipment (not shown). Prior to moving or straining web 30, such as loading, folding, or change of humidity, reference points (not shown) are marked along the surface 31 of the web 30. An exemplary method of marking reference points on a paperboard web is to print a dot grid pattern with half tone images (positive or negative) along the surface 31 of the web 30. Typically the dot pattern is in a square grid with a distance of approximately 0.2 mm between the dots. After the web 30 is moved, i.e a force is applied to the web 30, the strain of various locations on the web surface 31 can be determined by measuring the relative displacement of any sets of 4 dots (reference points) forming a square. This technique is useful to measure the strain of the web developed by moving or bending the web 30, such as folding the web 30 at a 90 degree or 180 degree fold.

For more complex web movements such as when both tensile and shear forces are placed on the web 30, various strain equations may be used to describe the strain at a particular web location by preparing a Mohr's Circle for plane strain. FIGS. 4*a* and 4*b* illustrate an exemplary set of four dots arranged in a square. The four dots are shown pictorially as the vertices of a square. FIG. 4*a* illustrated the reference state of the reference points and FIG. 4*b* the strained state of the reference points. The following strain equations can be used:

$$\epsilon_{ave} = \tfrac{1}{2}(\epsilon_x + \epsilon_y) \quad \text{Eq. 1}$$

$$R = [((\epsilon_x - \epsilon_y)/2)^2 + (\gamma_{xy}/2)^2]^{01/2} \quad \text{Eq. 2}$$

where:

$\epsilon_x$: tensile strain in the 'x' direction $\epsilon_y$: tensile strain in the 'y' direction $\epsilon_{ave}$: average strain defining the origin's abscissa of Mohr's circle $\gamma_{xy}$: shear strain R: radius of Mohr's strain circle In an exemplary method the relative location of four reference points or dots are determined using the optical scope means 2, apparatus 5, and stand-off 14. The technique also involves connecting an optical recording device (not shown), such as a camera, to the optical scope means 2. The operator takes a picture or optical data of the reference points at a known camera focal length prior to movement of the web 30. After the web 30 is moved, the relative location or displacement of the four dots is again optically recorded. The relative displacement of the reference points on the moved web can be determined using equations 1 and 2 above. It is to be understood that the measurement of reference point displacement and calculation of strain can be automated and determined using a microprocessor or similar means and a wide variety of optical reading, recording, detection, and analysis means.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method of measuring web strain comprising the steps of:

providing a web with a plurality of known reference points along the surface of the web;

providing an apparatus comprising a fiber optic scope means, a fiber optic tube means operatively connected to said fiber optic scope means, wherein said fiber optic tube means comprises a plurality of concentric tubes; and an adjustable stand-off means supported on said web and operatively connected to said fiber optic tube means;

providing a movement to said web so that said reference points are displaced; and using said apparatus to detect the relative displacement of said reference points.

2. The method of claim 1 wherein said fiber optic scope means further comprises optical fiber.

3. The method of claim 1 wherein said plurality of concentric tubes are cylindrically shaped.

4. The method of claim 1 wherein said adjustable stand-off means is touching said fiber optic tube means.

5. The method of claim 1 wherein an optical recording is operatively connected to said apparatus.

6. The method of claim 5 wherein said optical recording device is a camera.

7. The method of claim 6 wherein photographs of said reference points are taken before and after movement of the web.

8. The method of claim 6 wherein the relative displacement of said reference points before and after movement is determined by an optical reading and analysis device.

9. The method of claim 8 further comprising a digital processor means.

10. The method of claim 1 wherein the reference point displacement in the x and y direction is determined.

11. The method of claim 1 wherein the shear strain is determined.

12. The method of claim 1 wherein the Radius of Mohr's circle is determined.

* * * * *